US007640512B1

(12) United States Patent
Appling

(10) Patent No.: US 7,640,512 B1
(45) Date of Patent: Dec. 29, 2009

(54) UPDATING OBJECTS CONTAINED WITHIN A WEBPAGE

(75) Inventor: Stephen Charles Appling, Acworth, GA (US)

(73) Assignee: Automated Logic Corporation, Kennesaw, GA (US)

( * ) Notice: Subject to any disclaimer, the term of this patent is extended or adjusted under 35 U.S.C. 154(b) by 101 days.

(21) Appl. No.: 09/747,366

(22) Filed: Dec. 22, 2000

(51) Int. Cl.
  *G06F 3/00* (2006.01)
(52) U.S. Cl. ...................................... 715/771; 715/760
(58) Field of Classification Search ................. 715/517, 715/513, 731, 730, 771, 760, 732, 774, 779; 345/771, 774, 730, 731, 732, 760; 709/331, 709/332, 315
See application file for complete search history.

(56) References Cited

U.S. PATENT DOCUMENTS

| | | | | |
|---|---|---|---|---|
| 5,907,681 A | * | 5/1999 | Bates et al. | 709/228 |
| 5,978,807 A | * | 11/1999 | Mano et al. | 707/10 |
| 5,978,828 A | * | 11/1999 | Greer et al. | 709/224 |
| 5,983,231 A | * | 11/1999 | Minatogawa et al. | 707/102 |
| 6,006,142 A | * | 12/1999 | Seem et al. | 700/276 |
| 6,157,943 A | * | 12/2000 | Meyer | 709/203 |
| 6,385,510 B1 | * | 5/2002 | Hoog et al. | 700/276 |
| 6,427,168 B1 | * | 7/2002 | McCollum | 709/224 |
| 6,499,054 B1 | * | 12/2002 | Hesselink et al. | 709/204 |
| 6,556,223 B1 | * | 4/2003 | Tran et al. | 345/804 |
| 6,738,804 B1 | * | 5/2004 | Lo | 709/219 |
| 6,823,359 B1 | * | 11/2004 | Heidingsfeld et al. | 709/203 |

OTHER PUBLICATIONS

Graham, HTML 4.0 Sourcebook, 1998, Wiley Computer Publishing, pp. 347, 412.*
Flanagan, JavaScript, The definitive Guide, 1998, O'Reilly, 3rd edition, pp. 252, 622.*

* cited by examiner

*Primary Examiner*—Dennis Bonshock
(74) *Attorney, Agent, or Firm*—Kinney & Lange, P.A.

(57) ABSTRACT

Selectively updating objects of webpage without requiring that the entire web page be refreshed, without Java applets and without requiring user intervention. A webpage is defined to contain a frame and at least one updateable object that is external to the frame. The frame attributes of height and width may each be set to a value of zero, rendering it invisible on the displayed webpage. The frame is configured to periodically request updated data from a server in response to a timer reaching a threshold value. The updated data may comprise a Script or other instruction set for causing the frame to update at least one updateable object. The Script or other instruction set may be executable by the frame without user interaction. The Script may instruct the frame to interact with, for example, an external Script running within the webpage external to the frame. The external Script may interact with and modify the updateable object, which may be an HTML element, without refreshing the web page.

15 Claims, 5 Drawing Sheets

UPDATING OBJECTS CONTAINED WITHIN A WEBPAGE

TECHNICAL FIELD

This application relates generally to a method and system for selectively updating objects on a webpage, and more specifically to providing automatic updating of webpage objects without the need for refreshing the entire webpage.

BACKGROUND

Oftentimes, the content of a webpage is dynamic in nature. In some cases, changes to the content occur every few moments, as updated information is placed on a webpage. For example, stock market tickers and live camera feeds seen across the Internet may frequently send updated information to a web browser. This permits a nearly continuous media stream, which in turn keeps an observer informed of up-to-the-minute or time-critical events.

Many current implementations of dynamic webpages require that the webpage be frequently refreshed in order to display the newest information. A refresh action may be automatic (e.g., initiated by a timer) or may be initiated manually by the user. Manually refreshing a webpage consumes the user's time and attention. Additionally, refreshing a webpage requires that the entire webpage be reloaded, introducing significant time losses from retransmitting information that has not changed.

An alternate method of continuously updating a webpage includes the use of Java applets to receive information transmitted by an application program running on a remote server, hereinafter referred to as a "server-side application." Typically, the server-side application generates dynamically updated content that is then requested by or otherwise transmitted to a Java applet executed by a web browser at a local network client. By implementing a server-side application in combination with a local Java applet, the requirement of user intervention to refresh a page may be eliminated. However, this implementation is limited by the fact that the Java applet may only make changes to itself or to objects displayed within the applet. In the case where an object requiring updating is not a part of the applet, a user-initiated manual refresh is again required, or the Java applet must make use of the browser feature known as "LiveConnect". LiveConnect is a technology that allows a Java applet to communicate with JavaScript objects, and/or plug-in objects. Many web browsers, however, do not support the use of Java applets or the "LiveConnect" feature.

Thus, there is a need in the art for a method of updating objects contained within a webpage without requiring either a manual or automatic refresh of the webpage or the use of a Java applet.

SUMMARY OF THE INVENTION

The present invention meets the above described needs by providing for periodic updates of selective portions of a webpage without requiring that the entire webpage be reloaded ("refreshed"), and without user intervention or the use of Java applets. Generally speaking, the invention takes the form of a webpage containing a frame and at least one updateable object that is external to the frame. In one embodiment, the frame is an inline frame, which is also known as an "IFRAME." An exemplary embodiment of the present invention sets the height and width of the frame to zero, rendering it invisible on the displayed webpage so as not to detract from the overall visual design of the webpage. The frame is configured to periodically request updated data from a server. The frame may be configured to request the updated data from the server in response to a timer reaching a threshold value. The updated data may comprise, for example, an instruction set for causing the frame to update at least one updateable object. The frame is also configured, in response to receiving the updated data, to cause the appropriate updateable object to be updated. An updateable object may comprise an HTML element. The instruction set may comprise a Script generated by a server-side application, such as a servlet. The Script can be executed by the frame without user interaction. The Script may instruct the frame to interact with an external Script running within the webpage external to the frame. The external Script may interact with and modify the HTML element (updateable object) without refreshing the web page.

In an illustrative embodiment, the present invention is used for displaying on a webpage dynamically changing conditions within a building HVAC system. A server or other network element receives from a sensor an indication of a first state of a condition within the building HVAC system. The server or other network element then transmits to a web browser executed by a client device a webpage including an invisible inline frame and an updateable object, the updateable object displaying the first state of the condition within the building HVAC system. The server or other network element next receives from the sensor an indication of a second state of the condition within the building HVAC system. In response to receiving the indication of the second state of the condition, the server or other network element generates an instruction set for instructing the invisible inline frame to cause the updateable object to display the second state of the condition without refreshing the webpage.

That the invention improves over the drawbacks of prior webpage update systems and accomplishes the advantages described above will become apparent from the following detailed description of certain exemplary embodiments and the appended drawings and claims.

BRIEF DESCRIPTION OF THE DRAWINGS

FIG. 3, comprising

DETAILED DESCRIPTION OF EXEMPLARY EMBODIMENTS

The present invention provides content updates to a webpage displayed in a web browser, without the need for refreshing the entire webpage or requiring any user input or the use of Java applets. An exemplary embodiment of the present invention takes the form of a webpage comprising a frame for automatically updating updateable display objects external to the frame. Although any frame construct may be used in accordance with the present invention, the exemplary embodiments will be described herein with reference to an inline frame, or "IFRAME." An IFRAME is an HTML element that allows webpage authors to insert a frame in the middle of a webpage. Thus, for example, an IFRAME may be inserted within a block of text. An IFRAME functions as a distinct web browser window embedded within the main web browser window. Thus, the main web browser window may display a first webpage and the IFRAME may display a second webpage. In an exemplary embodiment of the present invention, however, the IFRAME is not used for displaying content. Instead, the IFRAME may be rendered invisible within the main web browser window by setting both its height and width attributes to a value of zero. Rendering the frame invisible is not a requirement of the present invention. However, an invisible frame is preferable so as not detract from the overall visual presentation of the webpage.

In conjunction with the web browser, the invisible IFRAME is capable of retrieving updated data from a remote server hosting server-side application. The invisible IFRAME may be configured to automatically and periodically contact the server-side application in order to request the updated data. When contacted by the invisible IFRAME, the server-side application may generate or otherwise retrieve the requested updated information and communicate the requested updated information to the invisible IFRAME. In an exemplary embodiment, the invisible IFRAME and the server-side application may communicate using the well-known hypertext transfer protocol ("HTTP") or other protocols known to those skilled in the art. Alternate embodiments may use different data transfer protocols to effect the invisible IFRAME request and server-side application response.

The updated data transmitted by the server-side application to the IFRAME may be used by the IFRAME to update updateable objects that are included within the webpage displayed by the main web browser window, external to the IFRAME. By way of example, an updateable object may comprise data displayed in another (visible) IFRAME. Updateable objects may also comprise data displayed by Java applets, Javascripts, or HTML elements. In this manner, selected updateable objects within the webpage may be automatically updated without requiring a complete refresh of the entire main webpage.

Figure 1:
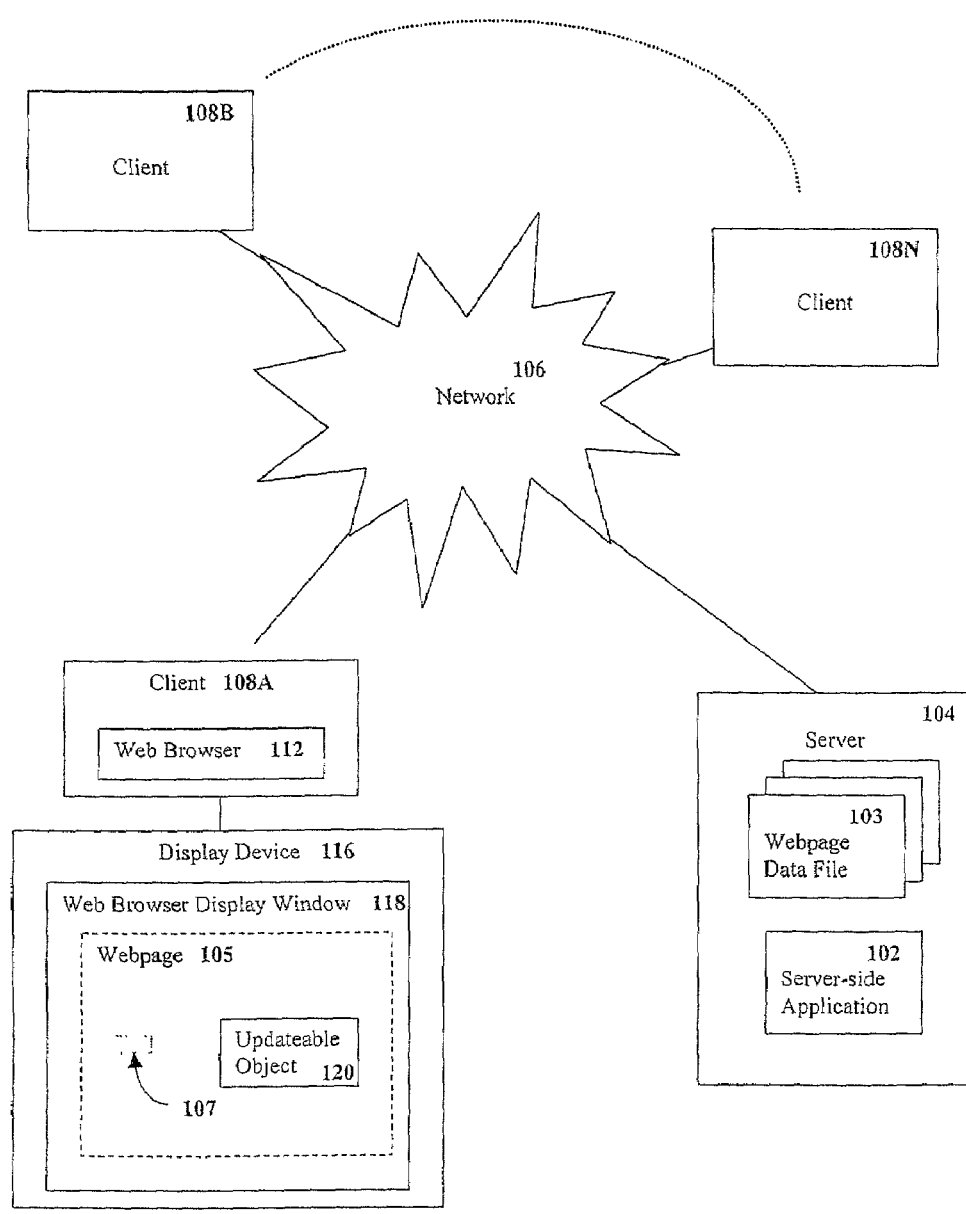
FIG. 1 is a block diagram illustrating an exemplary operating environment for exemplary embodiments of the present invention.

Referring now to the drawings, in which like numerals represent like elements throughout the several figures, aspects of the present invention and a suitable operating environment therefore will be described. FIG. 1 and the following discussion are intended to provide a brief and general description of a suitable computing environment for implementation of an exemplary embodiment of the present invention. The invention will herein be described in the general context of a webpage displayed by an application program, such as a web browser, that runs in conjunction with an operating system on a personal computer. However, those skilled in the art will recognize that the invention may also be implemented within the context of other computer system configurations, including minicomputers, mainframe computers, and the like. The invention may also be practiced in distributed computing environments where tasks are performed by remote processing devices that are linked through a communication network.

In an exemplary embodiment, a server-side application 102 resides on a server 104 that is in communication with a network 106, such as an internet or an intranet. The network 106 may comprise a telephone wireline and/or wireless network, a cellular network, a satellite network, a broadband network, and/or any other wireless or wire-based network. The server-side application 102 may be created using the Java programming language, for example. Alternate embodiments may employ different types of server-side applications, which may be created using different programming languages. Server-side applications may include servlets, Javascripts, CGI scripts, or any service capable of generating commands and interpretable and executable by a web browser 112.

One or more web page data files 103 are stored on, or are otherwise accessible to, the server 104. Web page data files 103 may comprise HTML code, XML code, server hypertext markup language ("SHTML") code, DHTML, Lynx and/or code generated in any other hypertext-like language. Web page data files 103 are transmitted over the network 106 to a client 108. A client 108 may be a personal computer, a laptop or handheld computer, a personal digital assistant (PDA), a mobile phone, or any other processor-driven device. A client 108A may execute a web browser 112 or other suitable application program for requesting, receiving and interpreting a webpage data file 103 and displaying the resulting webpage 105. The webpage 105 is typically displayed on a display device 116 within a web browser display window 118. In accordance with the present invention, the webpage data file 103 defines a webpage 105 that includes an invisible IFRAME 107 and an updateable object 120. The invisible IFRAME 107 is configured to cause an update of the updateable object 120, in response to updated data received from the server-side application 102. The invisible IFRAME 107 is shown in the figures as a dotted rectangle for the purpose of concept illustration only. In practice, the invisible IFRAME 107 is not visible on the webpage 105 as a result of setting its height, width and any other visibility attributes to a value of zero.

Figure 2:
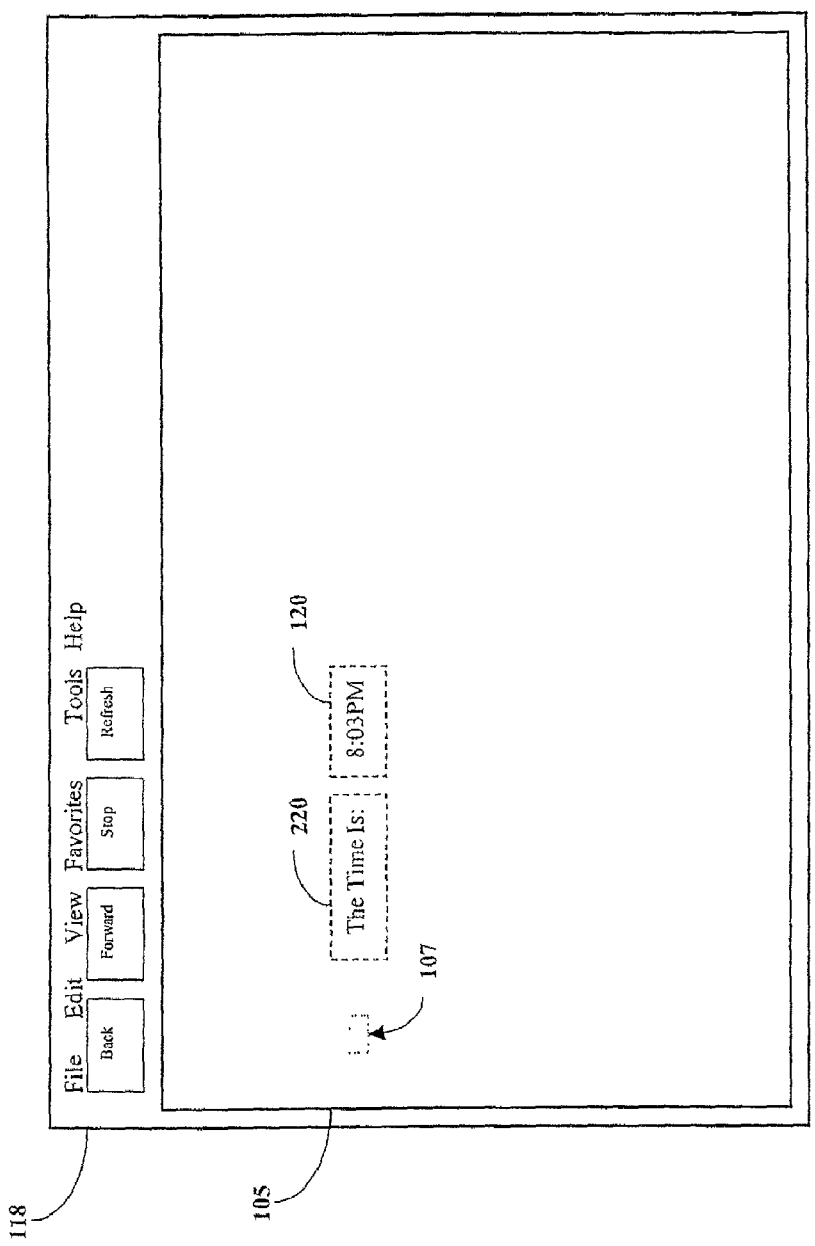
FIG. 2 is an illustration of a web page defined by a webpage data file in accordance with an exemplary embodiment of the present invention.

FIG. 2 illustrates an example of a web page 105 defined by a webpage data file 103 in accordance with an exemplary embodiment of the present invention. The web page 105 contains an invisible IFRAME 107, an updateable object 120 and a nonupdateable object 220. The nonupdateable object 220 comprises content that will not be altered by the present invention and generally remains unchanged over time on the webpage 105. By contrast, the updateable object 120 comprises content that is meant to change over time. An updateable object 120 may be, for example, an HTML element that is assigned a unique identifier within the code that defines the webpage 105. In the example of FIG. 2, the updateable object 120 comprises a display of the time of day, which obviously must be updated in order to provide accurate information. The nonupdateable object 220 comprises a display of information to identify the display of the time of day as such.

The invisible IFRAME 107 may be configured to automatically and periodically request updated data from a remote server 104. In order to set the time intervals between requests for updated data, a timer may be executed by the invisible IFRAME 107, by the web browser 112 or by any other program module that interacts with the invisible IFRAME 107. By way of example, the invisible IFRAME 107 may execute a timer that repeatedly counts from zero to an administrator-defined threshold value. When the timer reaches the threshold value, the invisible IFRAME 107 may be instructed to generate a request for updated data to the server 104. Implementation of various suitable timer schemes is well known to those skilled in the art and will therefore not be described in further detail herein.

In an exemplary embodiment, the timer is located at the client 108A and not the server 104, in order to avoid implementing a "server push" scheme. Server push refers to the transmission of data from a server 104 either continuously or at periodic intervals, without any data request from the web browser 112. An exemplary embodiment avoids a server push due to the fact that server pushes are blocked by certain firewalls. Further, some Internet service providers (ISPs) and/ or clients 108*a* may "timeout" and disconnect from the network 106 unless the web browser 112 occasionally transmits a data request to a server 104. By avoiding the server push implementation, the possibility of client timeout is minimized.

The updated data requested by the invisible IFRAME 107 is generated by the server-side application 102 or by another service in communication with the server 104. In a preferred embodiment, the updated data comprises JavaScript and the server-side application 102 comprises a Java servlet and/or Java Server Pages (JSP). As is known in the art, JavaScript comprises a list of commands that can be executed by the invisible IFRAME 107 without user interaction. The JavaScript received and executed by the invisible IFRAME 107 may cause the invisible IFRAME 107 to interact with other JavaScript that is executed by the web browser 112 in connection with the main webpage 105. For convenience of reference only, the JavaScript that is executed by the web browser 112 in connection with the main webpage 105 is referred to herein as "external JavaScript" because it is external to the invisible IFRAME 107. Then, in a normal fashion, the external JavaScript can interact with and modify HTML elements, such as updateable object 120, within the webpage 105. More particularly, the JavaScript received from the server-side application 102 may instruct the invisible IFRAME 107 to pass an updated value to the external JavaScript. The external JavaScript in turn uses the updated value to update the updateable object 120.

In the simple example shown in FIG. 2, the invisible IFRAME 107 may receive updated data from a remote server 104 at set intervals, which enables the invisible IFRAME 107 to update the time of day (updateable object 120) displayed in the web page 105. Thus, whenever an embedded timer reaches a threshold value, the invisible IFRAME 107 requests and receives updated data from the server-side application 102, and accordingly updates the time of day updateable object 120 without requiring the user to refresh the entire web page 105. As a practical matter, of course, the local timer could be used to update the displayed time of day without the need for communication with the remote server 104. Thus, while not a practical use for the present invention, the example described with reference to FIG. 2 serves to illustrate the concept of the present invention.

The use of an invisible IFRAME 107 to automatically update updateable objects 120 without the need to refresh the entire webpage 105 is not only more convenient to the user, but is also more efficient in terms of bandwidth consumption. By updating only specific updateable objects 120 rather than an entire webpage 105, the size of the data packets involved in the communications between the client 108 and the server 104 is reduced, resulting in faster and more efficient updates of the updateable objects 120. The efficiency of the present invention will, of course, be more recognizable in webpages 105 employing many updateable objects 120 as well as a significant amount of static content.

Those skilled in the art will appreciate that the updated data received by the invisible IFRAME 107 may alternately take other forms, such as HTML code, XML code, and so on. The updated data may further comprise raw data relayed from any network element. In one embodiment, the invisible IFRAME 107 may be self-determinative, in that it may be configured to process raw data in order to determine the updated values to pass to the external JavaScript, as opposed to directly receiving the updated values from the server-side application 102.

The HTML source code necessary to create the exemplary web page 105 and invisible IFRAME 107 of FIG. 2 is as follows:

```
<HTML>
<BODY>
  <IFRAME src="time.jsp" width="0" height="0"
  style="visibility:hidden">
</IFRAME>
The time is : <SPAN id="timeDiv">???</SPAN>
</BODY,
</HTML
```

The server-side application 102 may periodically generate updated data (e.g., Javascript instructions) that are transmitted to the exemplary invisible IFRAME 107 of FIG. 2. A sample Java Server Page (JSP) for generating updated data is as follows:

```
<HTML>
<SCRIPT>
window.parent.timeDiv.innerHTML="<%=new
java.util.Date( ) %>";
function refresh( ) {location.href=location.href; }
setTimeout (refresh, 2000);
</SCRIPT>
</HTML>
```

Again, the above code examples are provided by way of illustration only and are not intended to limit the scope of the present invention in any manner. Alternate embodiments may use different forms of source code, updated data and/or server-side applications 102 without departing from either the spirit or scope of the invention.

Figure 3A:
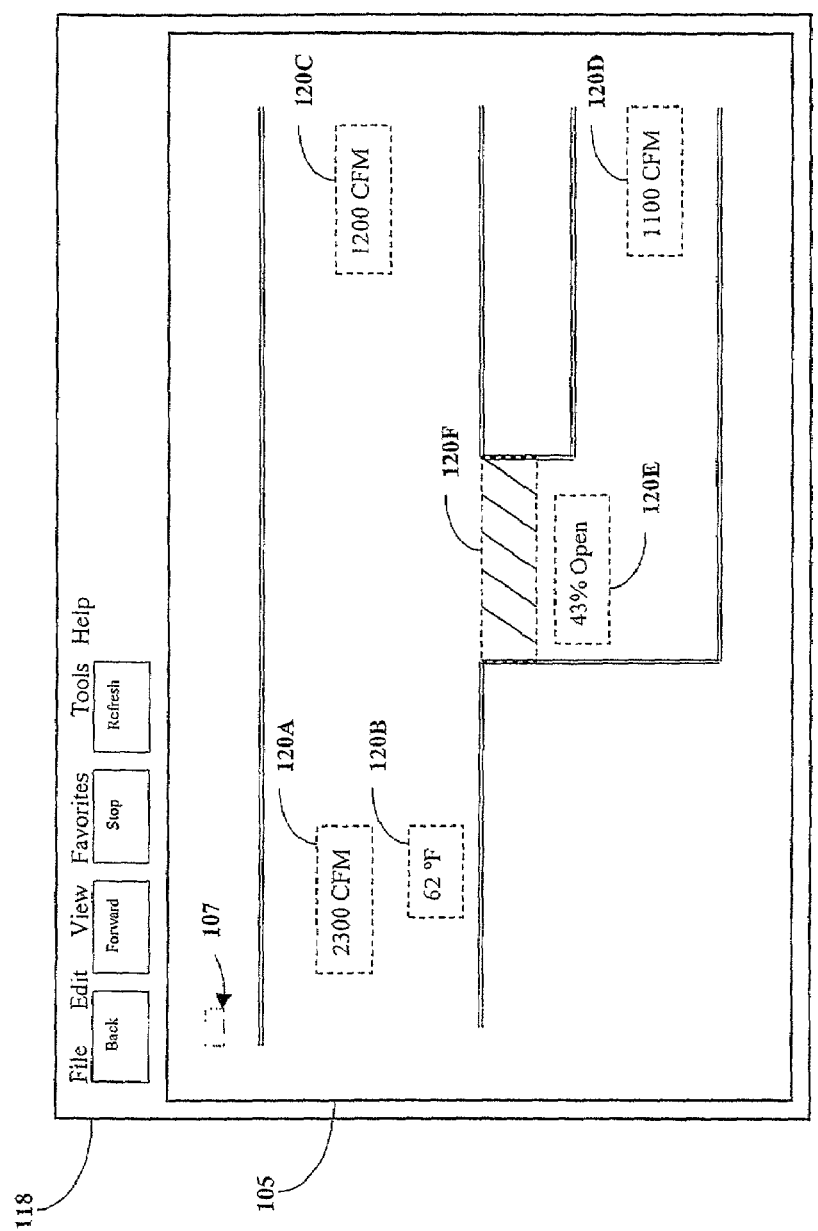
FIG. 3A & FIG. 3B, is an illustration of a webpage displaying dynamically updated conditions within a building HVAC system in accordance with an exemplary embodiment of the present invention.
Figure 3B:
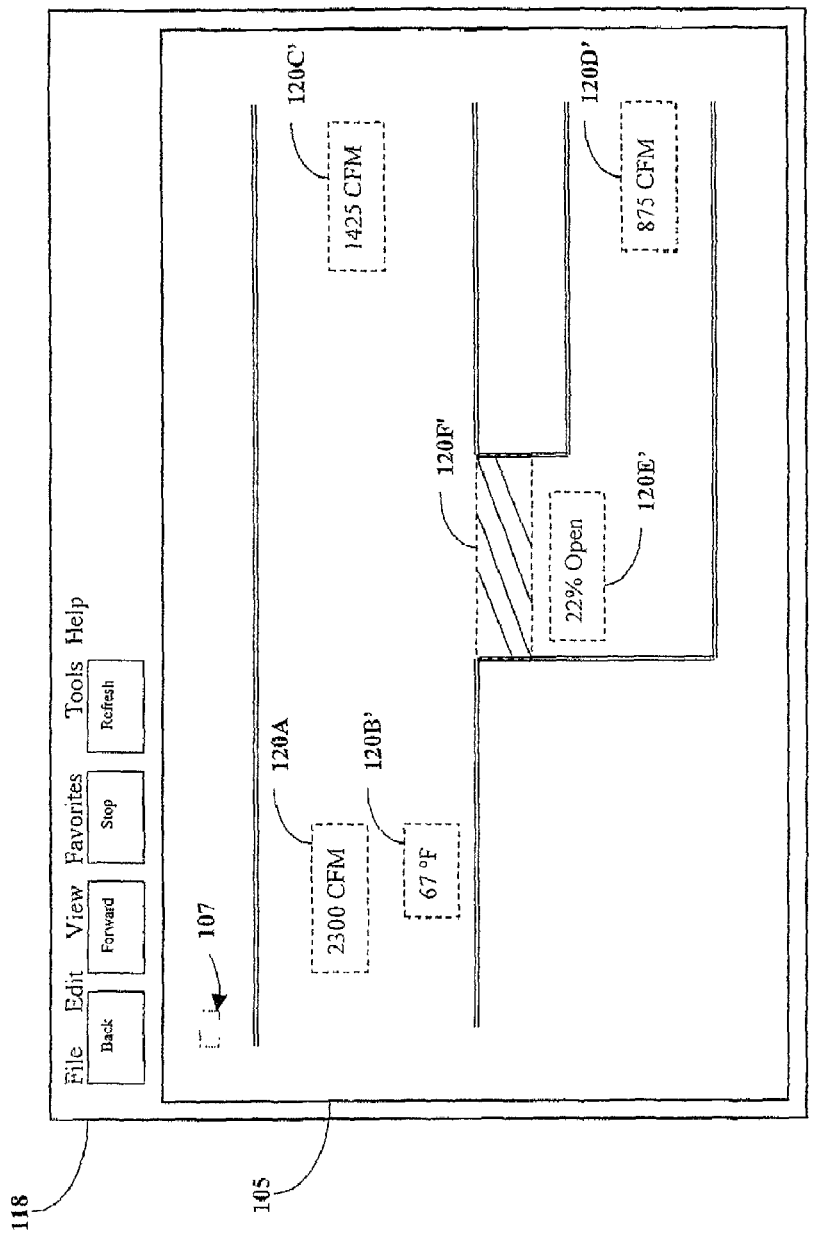

As mentioned above, the present invention may be useful in a web page employing many updateable objects 120. One possible application for the present invention is in the monitoring and display of airflow conditions within a building, as shown in FIG. 3. In the example of FIG. 3, comprising FIG. 3A and FIG. 3B, a web browser display window 118 displays a web page 105 representing an updateable schematic 300 of HVAC ductwork located within a building, such as an office building, a home, a warehouse, or any other building or facility. The building may be collocated at the client 108, the remote server 104, or may be in another location. Regardless of the building location, various portions of its HVAC system may contain small sensors that monitor conditions such as temperature, humidity, and/or other factors important in maintaining properly balanced airflow. It is well known that such sensors may periodically relay monitored data to a network device (e.g., a server 104), which may process the monitored data to determine updated data that reflects changes in comfort or environmental control levels.

The server 104 may then communicate the updated data to a client 108A for display on the web page 105. The webpage 105 includes an invisible IFRAME 107 and several updateable objects 120A-F that may be changed as actual conditions within the HVAC system change. The invisible IFRAME 107 periodically requests the updated data from the server 104. The updated data may be in the form of a Script or other instruction set that instructs the invisible IFRAME 107 to interact with the code (e.g., JavaScript) of the webpage data file 103 in order to modify one or more of the updateable objects 120A-F, so as to reflect changes in comfort level, air flow, etc.

In FIG. 3A, the webpage 105 displays a first state of an updateable HVAC duct schematic 300. The web page displays several updateable objects 120A-F, including the incoming airflow updateable object 120A, the airflow temperature updateable object 120B, the main outgoing airflow updateable object 120C, the sectional outgoing airflow updateable object 120D, the damper position updateable object 120E, and the damper display updateable object 120F. In the first state of the updateable HVAC duct schematic 300, the incoming airflow updateable object 120A displays a value of 2300 cubic feet per minute (CFM), the airflow temperature updateable object 120B displays a value of 62 degrees Fahrenheit, and the damper position updateable object 120E indicates that the damper is 43% open. The damper display 120F may be animated in an exemplary embodiment to show the damper opening and closing.

When the web page 105 is first loaded, a timer (not shown) within code that defines the invisible IFRAME 107 begins counting. Such timers are well known to those of ordinary skill in the art. Once the timer reaches a configurable threshold value, the invisible IFRAME 107 sends a request for updated data to the server 104. The server 104 relays to the invisible IFRAME 107 updated data comprising instructions to modify the various updateable objects 120A-F within the updateable HVAC schematic 300. For example, the invisible IFRAME 107 may receive instructions from the server 104 to change the value of the incoming airflow 120A because the amount of air passing through the duct has changed. Thus, in certain exemplary embodiments decisions as to what updateable objects 120A-F are updated, and thus what instructions are generated to cause such updates, are made by the server-side application 102 resident on the server 104. The instructions passed to the invisible IFRAME 107 are a result of this decision process. Alternate embodiments may pass raw data, as opposed to instructions, from the server 104 to the invisible IFRAME 107, and permit the client 108A to determine what updateable objects 120A-F, if any, must be changed.

FIG. 3B, the webpage 105 displays a second state of the updateable HVAC duct schematic 300. In the example shown in FIG. 3B, presume that two conditions have changed. First, the airflow temperature has risen by five degrees Fahrenheit. Second, the damper has been partially closed. The partial closing of the damper diminishes the airflow in the sectional portion of the HVAC duct, and accordingly increases the main outgoing airflow. In an exemplary embodiment, remote sensors located within the physical HVAC duct may have detected these changes and relayed updated data to the server 104, which in turn may generate updated data to be sent to the invisible IFRAME 107. Once the invisible IFRAME 107 executes its timed request to the server 104, the updated data is passed to the invisible IFRAME 107. Upon receiving the updated data from the server 104, the IFRAME 107 has caused the values of the airflow temperature updateable object 120B', the main outgoing airflow updateable object 120C', the sectional outgoing airflow updateable object 120D', the damper position updateable object 120E, and the damper display updateable object 120F' to be updated. In this manner, a user may have accurate information regarding the current airflow in a remote building displayed in an easy to recognize format, without manually requesting new data and without having to refresh the entire web page 105. Although the above example includes only temperature, position, and airflow as variables, many other factors may be monitored and updated as well. For example, humidity, chemical composition, volume, ambient noise level, and luminosity all may be monitored factors in various systems compatible with the web page object update system.

Figure 4:
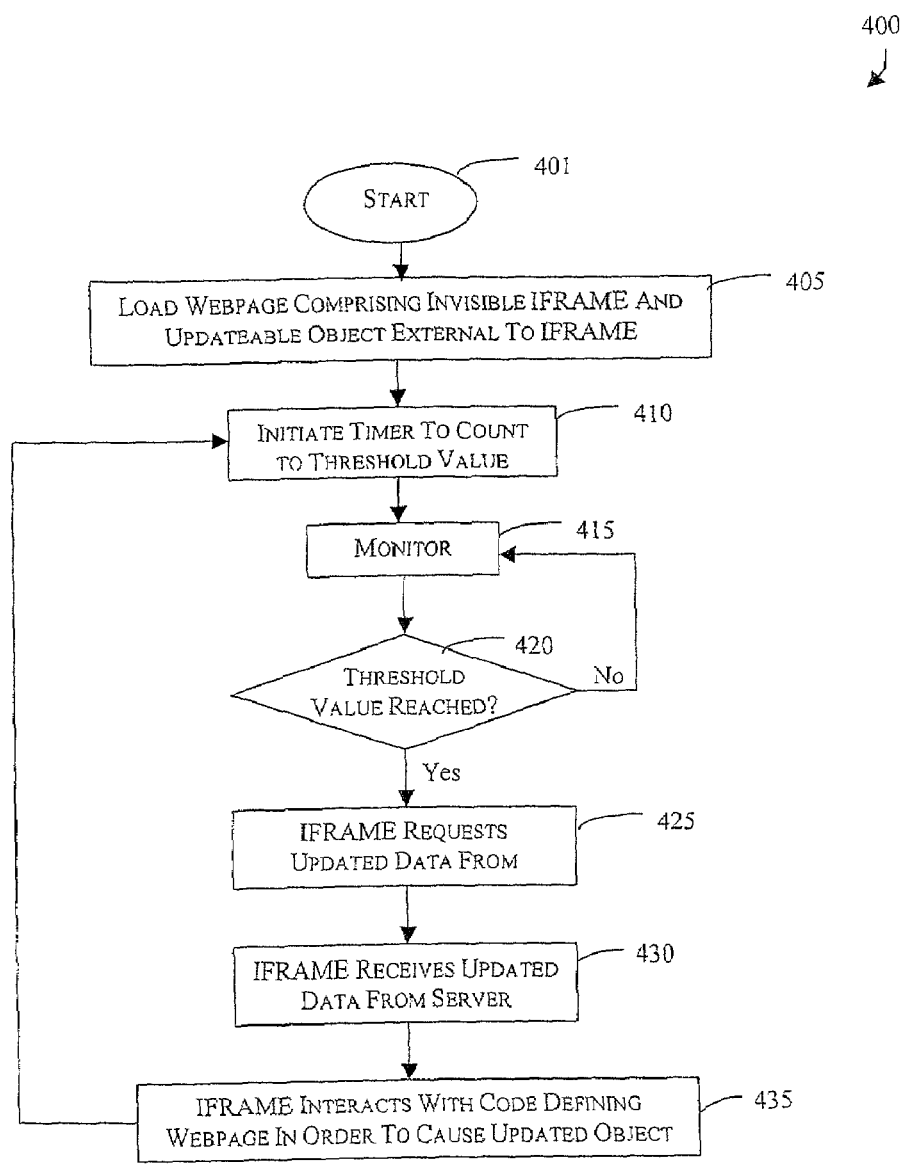
FIG. 4 is a flowchart illustrating operation of an exemplary embodiment of the present invention.

FIG. 4 is a flowchart illustrating the logical operation of a method 400 according to an exemplary embodiment of the present invention. The method 400 begins at starting block 401 and progresses to step 405, wherein a web page data file 103 is loaded into a web browser 112 and a resulting webpage 105 is displayed on a display monitor 116. The webpage 105 includes an invisible IFRAME 107 and at least one updateable object 120 that is external to the invisible IFRAME 107. Next, a timer is initiated at step 410. The timer counts to an administrator-defined threshold value in order to represent a duration of time. At step 415, the timer is monitored to determine whether the threshold value is reached. If at step 420 it is determined that the threshold value of the timer has not been reached, the method returns to step 415 to continue monitoring the timer. When it is determined at step 420 that the threshold value of the timer has been reached, the method advances to step 425 where the invisible IFRAME 107 initiates a request for updated data from a remote server 104. In response to the request for updated data, the invisible IFRAME 107 receives from the server 104 the updated data at step 430. The updated data may comprise instructions for instructing the invisible IFRAME 107 to update or otherwise modify the updateable objects 120 of the web page 105.

Once the updated data and instruction set is received the method moves to step 435. At step 435, the invisible IFRAME 107 interacts with the webpage data file 103 to update the updateable objects 120 of the web page 105 that are external to the invisible IFRAME 107, in accordance with the updated data. Following step 435, the method 400 is repeated from step 410, where the timer is reset to again count to the threshold value. As may be seen from FIG. 4, the method 400 comprises a loop for automatically and periodically updating updateable objects. The embodiments described herein are by way of example only and are not intended to limit the scope of the present invention in any manner. Alternate embodiments of the present invention may include additional functionality not explicitly described herein. For example, in an alternate embodiment, the timer may be activated only in response to a user input, and then deactivated in response to a second user input. As another example, alternate embodiments of the present invention may make use of inline frames with dimensions other than a height and width of zero, without affecting the performance of the invention. Additionally, the present invention may be useful in connection with any application program that is capable of processing a webpage data file and displaying a resulting web page, such as a word processor with appropriate extensions or an HTML editor. Many other modifications to the invention will become evident to one of ordinary skill in the art in view of the preceding description of exemplary embodiments. Therefore, it should be understood that the scope of the present invention is limited only by the following claims.

I claim:

1. A method for updating objects contained within a web page, comprising:

displaying a web page;

creating a frame having a height of zero and a width of zero within the web page;

displaying outside the frame at least one updateable object within the web page, wherein the at least one updateable object corresponds to an HVAC system;

configuring the frame to periodically request updated data from a server, the updated data comprising an instruction set for causing the frame to update the at least one updateable object;

configuring the frame to request the undated data from the server in response to a timer maintained on a client reaching a threshold value, wherein the timer is configured to be initiated as a function of creation of the frame; and configuring the frame, in response to receiving the updated data, to cause the at least one updateable object to be updated, such that the updating of the at least one updateable object updates only a portion of the web page.

2. The method of claim 1, wherein the at least one updateable object is an HTML element.

3. The method of claim 1, wherein the instruction set comprises a Script that is executable by the frame without user interaction.

4. The method of claim 1, wherein causing the at least one updateable object to be updated comprises interacting with an external Script running within the webpage external to the frame in order to cause the external Script to modify the updateable object without refreshing the web page.

5. The method of claim 1, wherein the updated data is generated by a Java servlet executed by the server.

6. A method for displaying on a webpage dynamically changing conditions within a building HVAC system, comprising:
    receiving from a sensor an indication of a first state of a condition within the building HVAC system;
    transmitting to a web browser executed by a client device a webpage including a frame having a height of zero and a width of zero and an updateable object, the updateable object displaying the first state of the condition within the building HVAC system;
    configuring the frame to request updated information regarding the condition within the building HVAC system in response to a timer maintained on the client device reaching a threshold value, wherein the timer is configured to be initiated as a function of web browser execution by the client device;
    periodically receiving from the sensor an indication of a second state of the condition within the building HVAC system;
    in response to receiving the indication of the second state of the condition, generating an instruction set for instructing the frame to cause the updateable object to display the second state of the condition without refreshing the entire webpage; and
    in response to a request for updated data from the invisible frame, transmitting the instruction set to the invisible frame for execution thereof.

7. The method of claim 6, wherein the frame comprises an HTML element.

8. The method of claim 6, wherein the instruction set comprises a Script that is executable by the frame without user interaction.

9. The method of claim 6, wherein the instruction set instructs the frame to interact with an external Script running within the webpage external to the frame in order to cause the external Script to modify the updateable object without refreshing the web page.

10. The method of claim 6, wherein the condition is selected from the group consisting of time, temperature, airflow and damper position.

11. A system for updating objects contained within a web page, comprising:
    a communications device for receiving a webpage data file and updated data from at least one server;
    a processor coupled to the communications device for executing a web browser, the web browser requesting, receiving and interpreting the webpage data file, the webpage data file comprising computer-executable instructions for:
    creating a webpage,
    creating a frame having a height of zero and width of zero within the web page,
    displaying outside the frame at least one updateable object within the web page,
    wherein the at least one updateable object corresponds to an HVAC system,
        configuring the frame to periodically request the updated data from the server in response to a timer maintained on a client reaching a threshold value, the updated data comprising an instruction set for causing the frame to update the at least one updateable object, wherein the timer is configured to be initiated as a function of the web browser requesting, receiving and interpreting the web age data file, and
        configuring the frame, in response to receiving the updated data, to cause the at lease one updateable object to be updated, such that the updating of the at least one updateable object updates only a portion of the web page; and
    a display device coupled to the processor for displaying the web page created by the web browser.

12. The system of claim 11, wherein the instruction set comprises a Script that is executable by the frame without user interaction.

13. The system of claim 11, wherein causing the at lease one updateable object to be updated comprises interacting with an external Script running within the webpage external to the frame in order to cause the external Script to modify the updateable object without refreshing the web page.

14. The system of claim 11, wherein the updated data is generated by a Java servlet executed by the server.

15. The system of claim 11, wherein the frame is an inline frame.

* * * * *

UNITED STATES PATENT AND TRADEMARK OFFICE
CERTIFICATE OF CORRECTION

PATENT NO.       : 7,640,512 B1                               Page 1 of 1
APPLICATION NO. : 09/747366
DATED            : December 29, 2009
INVENTOR(S)      : Stephen Charles Appling It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 320 days.

Signed and Sealed this

Ninth Day of November, 2010

David J. Kappos
*Director of the United States Patent and Trademark Office*